June 8, 1937. W. T. ANDERSON, JR., ET AL 2,082,934

ULTRAVIOLET RAY APPARATUS

Filed Feb. 18, 1937

INVENTORS
William T. Anderson, Jr.
BY Carl P. Larsen
Fred C. Fischer
ATTORNEY

Patented June 8, 1937

2,082,934

UNITED STATES PATENT OFFICE 2,082,934

ULTRAVIOLET RAY APPARATUS

William T. Anderson, Jr., Newark, and Carl J. Larsen, East Orange, N. J., assignors to Hanovia Chemical and Manufacturing Company, Newark, N. J., a corporation of New Jersey Application February 18, 1937, Serial No. 126,424

9 Claims. (Cl. 128—396)

This invention relates to ultraviolet ray devices and more particularly to means for measuring and indicating the intensity of ultraviolet rays.

For many purposes, and especially for the therapeutic application of ultraviolet rays in the hospital, clinic, and doctor's office, it is very desirable to know the intensity of the ultraviolet radiations, and to be able to maintain an approximately constant intensity.

All therapeutic ultraviolet lamps vary with the electric power input, and those which have special ultraviolet transmitting glass or quartz envelopes also experience alterations in the transparency of the envelope with usage. These latter lamps, which constitute the majority of ultraviolet lamps in use, exhibit therefore a progressive diminution in output with usage even when the electric input is maintained.

It has become customary to employ the biological erythema reaction to gauge ultraviolet intensity. In many instances this test has been supplemented with photochemical reactions such as the oxalic decomposition, the methylene blue color change, and the lithophone darkening test. For more elaborate control photoelectric cells of both the electronic and photronic types have been used.

The chemical methods are accurate in experienced hands, but require the maintenance of critical conditions, and frequently laboratory facilities. The photocell devices are only reliable when used by an experienced operator, and must be subject to constant check. They frequently shown variable indications for like intensities of light dependent upon temperature and intensity conditions.

It is an object of this invention to provide in connection with an ultraviolet ray generating device, relatively simple means for indicating the intensity of the ultraviolet rays.

Figure 1:
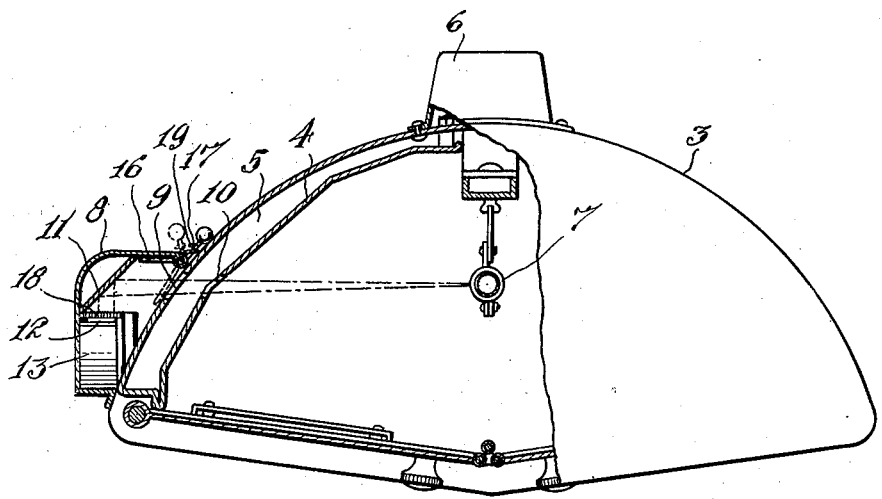
Figure 2:
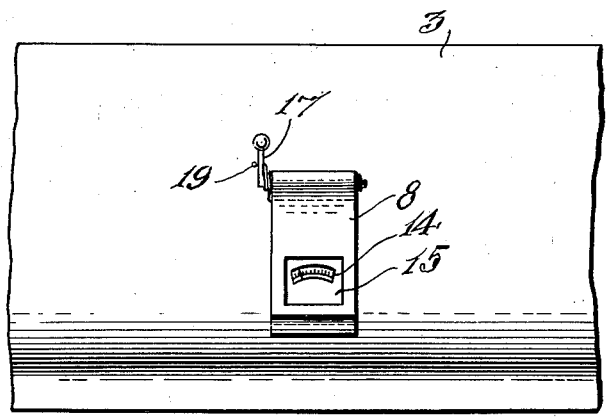

This and other advantageous objects, which will later appear, are accomplished by the simple and practical construction and arrangement of parts hereinafter described and exhibited in the accompanying drawing, forming part hereof, and in which:

Fig. 1 is a sectional view showing an ultraviolet ray generating apparatus embodying my invention, and Fig. 2 is a side view of a portion of the apparatus.

Referring to the drawing, in Fig. 1 there is shown an ultraviolet ray generating device for therapeutic use which comprises a hood 3 having mounted inside thereof a reflector 4, which is spaced from the hood to provide an air passage 5 communicating with a ventilator 6, mounted over the center portion of the hood and opening into the hood.

Supported by the hood beneath the ventilator is an ultraviolet ray generating device 7. Mounted on one side of the hood is a small casing 8, and the hood and reflector are provided respectively with openings 9 and 10 on a level with the ultraviolet ray generator 7 to allow ultraviolet rays to enter the casing 8. Mounted in the casing 8 at a 45 degree angle is a reflecting mirror 11 which reflects the ultraviolet rays onto a photocell 12, connected to a meter 13, which is a meter capable of measuring extremely small electrical currents.

The scale 14 of the meter is visible through a window 15 in the casing 8 so that the intensity of the ultraviolet rays can be readily ascertained at any time.

Mounted on the hood 3 adjacent the opening 9 is a shutter 16 which has connected thereto an arm 17 by means of which the shutter can be manipulated to cover or uncover the opening 9 when desired. Positioned over the photocell is a diffusion plate 18.

The photocell device herein described, is permanently mounted on the hood in a fixed position relative to the ultraviolet ray generator, and is thermally insulated from the warm or heated portions of the lamp by insulating materials such as fiber, asbestos, bakelite, etc. As shown in the drawing, in one particular useful arrangement, the sensitive surface of the photocell is positioned substantially at right angles to the direction of the rays from the ultraviolet ray generator 7. The ultraviolet rays and visible light is reflected into the cell and upon the sensitive surface by a suitable mirror 11. For the mirror 11 it is preferred to use aluminum because it is an excellent reflector for the ultraviolet rays, but is not a good reflector for visible and infrared radiations. By using a mirror of this kind, the amount of unwanted radiations which would otherwise fall upon the sensitive surface of the cell and result in overheating is greatly reduced. In the photronic type of photocell, the indicating meter can be mounted directly under the cell itself.

Since continued exposure of sensitive photocell surfaces to ultraviolet rays results in continual loss of sensitivity in the cell surface, it is necessary that the cell be exposed to the ultraviolet rays during as short a period of time as is required for receiving an actual indication of the intensity of the meter. For this reason the shutter 16 is preferably maintained closed by means of a spring device 19, so that the operator must hold the lever 17 while taking the reading.

When no readings are being taken, the cell is maintained continually in darkness.

From the above description it will be seen that there has been provided a simple device for readily ascertaining whenever desired the intensity of ultraviolet rays being emitted from an ultraviolet ray generator. Readings on the indicating meter can be quickly made and the services of a skilled operator are not required, as has heretofore been the case when it was necessary to resort to biological erythema reactions and other methods as mentioned above.

The foregoing disclosure is to be regarded as descriptive and illustrative only, and not as restrictive or limitative of the invention, of which obviously embodiments may be constructed including many modifications, without departing from the general scope herein indicated and denoted in the appended claims.

Having thus described our invention, what we claim as new and desire to secure by Letters Patent, is:

1. In an ultraviolet ray apparatus for therapeutic purposes, a hood having an ultraviolet ray generator mounted therein, a casing mounted on the hood, said hood having an opening communicating with said casing, a reflecting mirror mounted in said casing, said mirror and opening and generator being substantially on the same level, a photocell mounted in said casing adjacent the mirror to receive reflected radiations therefrom, and an indicating meter connected to said photocell.

2. In an ultraviolet ray apparatus for therapeutic purposes, a hood having an ultraviolet ray generator mounted therein, a casing mounted on the hood, said hood having an opening communicating with said casing, a reflecting mirror mounted in said casing, said mirror and opening and generator being substantially on the same level, a photocell mounted in said casing adjacent the mirror to receive reflected radiations therefrom, an indicating meter connected to said photocell, and a shutter for maintaining said opening covered except when readings are to be taken on an indicating meter.

3. In an ultraviolet ray apparatus for therapeutic purposes, a hood having an ultraviolet ray generator mounted therein, a casing mounted on the hood, said hood having an opening communicating with said casing, a reflecting mirror mounted in said casing at an angle of 45 degrees to a line between said generator and opening, a photocell mounted in said casing adjacent the mirror to receive reflected radiations therefrom, and an indicating meter connected to said photocell.

4. In an ultraviolet ray apparatus for therapeutic purposes, a hood having an ultraviolet ray generator mounted therein, a casing mounted on the hood, said hood having an opening communicating with said casing, a reflecting mirror mounted in said casing at an angle of 45 degrees to a line between said generator and opening, a photocell mounted in said casing adjacent the mirror to receive reflected radiations therefrom, an indicating meter connected to said photocell, and means for normally covering said opening.

5. In an ultraviolet ray apparatus for therapeutic purposes, a hood having an ultraviolet ray generator mounted therein, a casing mounted on the hood, said hood having an opening communicating with said casing, a reflecting mirror mounted in said casing, said mirror and opening and generator being substantially on the same level, a photocell mounted in said casing adjacent the mirror to receive reflected radiations therefrom, an indicating meter connected to said photocell, and means for normally covering said opening.

6. In an ultraviolet ray apparatus for therapeutic purposes, a hood having an ultraviolet ray generator mounted therein, a casing mounted on the hood, said hood having an opening communicating with said casing, an aluminum reflector mounted in said casing on a line connecting said opening and generator, ultraviolet ray sensitive means mounted in said casing adjacent the reflector to receive radiations therefrom, and an indicating meter connected to said ultraviolet ray sensitive means.

7. In an ultraviolet ray apparatus for therapeutic purposes, a hood having an ultraviolet ray generator mounted therein, a casing mounted on the hood, said hood having an opening communicating with said casing, a reflector mounted in said casing to receive radiations from said generator through the opening, ultraviolet ray sensitive means mounted in the casing adjacent the reflector to receive radiations therefrom, and means associated with said ultraviolet ray sensitive means to indicate the intensity of said radiations.

8. In an ultraviolet ray apparatus for therapeutic purposes, a hood having an ultraviolet ray generator mounted therein, a casing mounted on the hood, said hood having an opening communicating with said casing, a reflector mounted in said casing to receive radiations from said generator through the opening, ultraviolet ray sensitive means mounted in the casing adjacent the reflector to receive radiations therefrom, means associated with said ultraviolet ray sensitive means to indicate the intensity of said radiations, and means for normally covering said opening.

9. In an ultraviolet ray apparatus for therapeutic purposes, a hood having an ultraviolet ray generator mounted therein, a casing mounted on the hood, said hood having an opening communicating with said casing, an aluminum reflector mounted in said casing on a line connecting said opening and generator, ultraviolet ray sensitive means mounted in said casing adjacent the reflector to receive radiations therefrom, an indicating meter connected to said ultraviolet ray sensitive means, and means for normally covering said opening.

WILLIAM T. ANDERSON, Jr.
CARL J. LARSEN.